US012780459B2

(12) United States Patent
Zhang et al.

(10) Patent No.: US 12,780,459 B2
(45) Date of Patent: Nov. 3, 2026

(54) PANORAMIC UNMANNED AERIAL VEHICLE

(71) Applicant: ARASHI VISION INC., Shenzhen (CN)

(72) Inventors: Guilin Zhang, Shenzhen (CN); Fanli Pang, Shenzhen (CN); Fei Gao, Shenzhen (CN); Jingkang Liu, Shenzhen (CN)

(73) Assignees: ARASHI VISION INC., Shenzhen (CN); ANTIGRAVITY (SZ) TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/180,035

(22) Filed: Apr. 15, 2025

(65) Prior Publication Data

US 2026/0145824 A1 May 28, 2026

Related U.S. Application Data

(63) Continuation of application No. PCT/CN2022/132742, filed on Nov. 18, 2022.

(51) Int. Cl.
*B64U 20/87* (2023.01)
*B64U 10/14* (2023.01)
(Continued)

(52) U.S. Cl.
CPC ............. *B64U 20/87* (2023.01); *B64U 10/14* (2023.01); *B64U 20/50* (2023.01); *B64U 30/293* (2023.01);
(Continued)

(58) Field of Classification Search
CPC ...... B64U 20/87; B64U 20/50; B64U 30/293; B64U 2101/30
See application file for complete search history.

(56) References Cited

U.S. PATENT DOCUMENTS

2017/0036771 A1 2/2017 Woodman et al.
2018/0181119 A1* 6/2018 Lee ...................... G05D 1/0038
(Continued)

FOREIGN PATENT DOCUMENTS

CN 205121152 U 3/2016
CN 107891991 A 4/2018
(Continued)

OTHER PUBLICATIONS

International Search Report in the international application No. PCT/CN2022/132742, mailed on Jul. 27, 2023. 12 pages with English translation.
(Continued)

*Primary Examiner* — Joshua J Michener
*Assistant Examiner* — Colin Zohoori
(74) *Attorney, Agent, or Firm* — BAYES PLLC

(57) ABSTRACT

Certain aspects of implementations in the present disclosure provide a panoramic Unmanned Aerial Vehicle (UAV). The UAV includes a body, a plurality of arms connected to the body, a first fisheye lens located on one side of the body, and a second fisheye lens located at an opposing side of the body. The first fisheye lens includes a first stitching region. The second fisheye lens includes a second stitching region. A stitching blind area is formed by a region that is not covered by a first stitching region and is not covered by a second stitching region. When the plurality of arms are in an unfolded mode, remaining components of the panoramic UAV, other than the first fisheye lens and the second fisheye lens, are located within the stitching blind area.

10 Claims, 6 Drawing Sheets

(51) Int. Cl.

| | |
|---|---|
| ***B64U 20/50*** | (2023.01) |
| ***B64U 30/293*** | (2023.01) |
| ***B64U 50/30*** | (2023.01) |
| ***B64U 60/70*** | (2023.01) |
| ***G02B 13/06*** | (2006.01) |
| ***G03B 15/00*** | (2021.01) |
| ***G03B 37/00*** | (2021.01) |
| *B64U 101/30* | (2023.01) |

(52) U.S. Cl.

CPC ............. *B64U 50/30* (2023.01); *B64U 60/70* (2023.01); *G02B 13/06* (2013.01); *G03B 15/006* (2013.01); *G03B 37/00* (2013.01); *B64U 2101/30* (2023.01)

(56) References Cited

U.S. PATENT DOCUMENTS

| | | | | |
|---|---|---|---|---|
| 2018/0186472 | A1* | 7/2018 | Wan | B64C 25/10 |
| 2024/0132237 | A1* | 4/2024 | Xiao | B64U 10/25 |
| 2026/0091890 | A1* | 4/2026 | Xiao | B64U 10/14 |

FOREIGN PATENT DOCUMENTS

| | | | |
|---|---|---|---|
| CN | 210405535 | U | 4/2020 |
| CN | 112837207 | A | 5/2021 |
| CN | 113873259 | A | 12/2021 |
| CN | 115174805 | A | 10/2022 |
| CN | 217706281 | U | 11/2022 |
| GB | 2360413 | A | 9/2001 |
| WO | 2022226932 | A1 | 11/2022 |

OTHER PUBLICATIONS

Written Opinion of the International Search Authority in the international application No. PCT/CN2022/132742, mailed on Jul. 27, 2023. 9 pages with English translation.

International Preliminary Report on Patentability (Chapter I of the Patent Cooperation Treaty) in the international application No. PCT/CN2022/132742, mailed on Jul. 27, 2023. 11 pages with English translation.

Supplementary European Search Report issued in corresponding European Application No. EP 22965547, mailed on Aug. 19, 2025, 8 pages.

* cited by examiner

PANORAMIC UNMANNED AERIAL VEHICLE

CROSS-REFERENCE TO RELATED APPLICATION

The present disclosure claims the benefit of priority to International Application No. PCT/CN 2022/132742, filed on Nov. 18, 2022, the entire content of which is hereby incorporated by reference in its entirety.

BACKGROUND

The present disclosure relates to Unmanned Aerial Vehicles (UAVs), and more particularly, to a panoramic UAV.

UAVs are typically equipped with one or more cameras mounted on its body to capture video. In order to obtain panoramic images or videos, the arrangement of the camera may need to be carefully considered.

SUMMARY

Based on the above, there is a need to provide a panoramic UAV that achieves a panoramic field of view while improving the UAV's endurance time.

A panoramic UAV includes:

a body, including a top shell, a bottom shell, and a side shell connected between the top shell and the bottom shell, where the bottom shell includes a supporting surface away from the top shell, and the side shell includes a first side shell and a second side shell arranged opposite to each other;

a plurality of arms, connected to the first side shell and the second side shell, the plurality of arms having an unfolded mode;

a first fisheye lens, arranged on the top shell, the first fisheye lens having a first field of view region and a first stitching region not exceeding the range of the first field of view region; and a second fisheye lens, arranged on the bottom shell and located completely between the top shell and the plane where the supporting surface is located, the second fisheye lens having a second field of view region and a second stitching region not exceeding the range of the second field of view region, where a region not covered by the first stitching region and not covered by the second stitching region forms a stitching blind area, and where when the plurality of arms are in the unfolded mode, components of the panoramic UAV other than the first fisheye lens and the second fisheye lens are located within the stitching blind area.

In some implementations, the panoramic UAV includes a battery and a main control board. The first fisheye lens and the second fisheye lens are located at one end of the panoramic UAV, and the battery and/or the main control board are located at the other end of the panoramic UAV.

In some implementations, the bottom shell includes a base shell and a supporting part arranged on the base shell, a surface of the supporting part away from the base shell is the supporting surface.

In some implementations, the supporting part includes a first supporting part and a second supporting part. The first supporting part is located between the second fisheye lens and the second supporting part. The center of gravity of the panoramic UAV is located between the first supporting part and the second supporting part. The distance between the supporting surface of the second supporting part and the base shell is less than the distance between the supporting surface of the first supporting part and the base shell.

In some implementations, the plurality of arms may include two first arms. The two first arms are respectively connected to the first side shell and the second side shell. A surface of each first arm at an end away from the top shell is a grounding surface. In the unfolded mode, the grounding surface is coplanar with the supporting surface of the first supporting part.

In some implementations, the plurality of arms may further include two second arms. The two second arms are respectively connected to the first side shell and the second side shell. The two second arms are arranged closer to the top shell than the two first arms. The two first arms are located on a side of the first supporting part away from the second fisheye lens, and the two second arms are located on a side of the first supporting part close to the second fisheye lens.

In some implementations, the plurality of arms are foldably connected to the first side shell and the second side shell. The plurality of arms further have a folded mode. When the plurality of arms are in the folded mode, the second fisheye lens is located between the two first arms, and the grounding surface is located between the supporting surface of the first supporting part and the top shell.

In some implementations, each arm includes a rotating arm rotatably connected to the side shell and a blade rotatably connected to an end of the rotating arm away from the side shell. In the folded mode, the rotating arm of the first arm and the rotating arm of the second arm rotate towards each other and close to their respective side shells.

In some implementations, the number of the first supporting part and the number of the second supporting part are both two, and the two first supporting parts and the two second supporting parts are respectively located on two sides of the second fisheye lens.

In some implementations, the bottom shell includes a first base shell part and a second base shell part. The second base shell part is connected to the first base shell part and inclined towards the top shell. The second fisheye lens is arranged on the second base shell part.

In some implementations, the second base shell part is a concave curved surface or an inclined surface, and a central axis of the second fisheye lens coincides with a normal vector of the second base shell part.

In some implementations, the top shell includes a first top shell part, a second top shell part, and a third top shell part. The second top shell part is recessed between the first top shell part and the third top shell part. A part of the third top shell part farthest from the plane where the supporting surface is located is closer to the plane where the supporting surface is located than a part of the first top shell part farthest from the plane where the supporting surface is located. The first fisheye lens is convexly arranged on the part of the first top shell part farthest from the plane where the supporting surface is located and is inclined towards the third top shell part.

In some implementations, the first top shell part and the third top shell part are convex curved surfaces, and the second top shell part is a concave curved surface.

In some implementations, a central axis of the first fisheye lens coincides with a central axis of the second fisheye lens.

In some implementations, the body further includes a front shell. The front shell is connected to the top shell and the bottom shell at an end close to the second fisheye lens. The front shell is a convex curved surface.

In some aspects, a panoramic Unmanned Aerial Vehicle (UAV) is provided. The panoramic UAV may include a body; a plurality of arms connected to the body; a first fisheye lens located at one side of the body, the first fisheye lens including a first stitching region; and a second fisheye lens located at an opposing side of the body, the second fisheye lens including a second stitching region. A stitching blind area may be formed by a region that is not covered by the first stitching region and is not covered by the second stitching region. When the plurality of arms are in an unfolded mode, remaining components of the panoramic UAV, other than the first fisheye lens and the second fisheye lens, may be located within the stitching blind area.

In some implementations, the panoramic UAV may further include a battery and a main control board; and the first fisheye lens and the second fisheye lens are located at one end of the panoramic UAV, and at least one of the battery or the main control board is located at another end of the panoramic UAV.

In some implementations, the one side of the body comprises a top of the body, and the opposing side of the body comprises a bottom of the body.

In some implementations, the bottom of the body may include a supporting part.

In some implementations, the plurality of arms may include two first arms each including a grounding surface located at an end away from the body, and when the two first arms are in the unfolded mode, the grounding surface and the supporting part may be in contact with a landing surface.

In some implementations, the plurality of arms may further include two second arms respectively connected to the body, the two second arms being closer to the top of the body than the two first arms; and the two first arms may be located on a side of the supporting part away from the second fisheye lens, and the two second arms may be located on another side of the supporting part close to the second fisheye lens.

In some implementations, the two first arms may be foldably connected to the body; and when the two first arms are in a folded mode, the second fisheye lens may be located between the two first arms.

In some implementations, each arm of the plurality of arms may include a rotating arm rotatably connected to the body, a blade being provided at an end of the rotating arm away from the body; and when the plurality of arms switch from the unfolded mode to the folded mode, the rotating arms may rotate towards each other in a direction toward the body.

In some implementations, a central axis of the first fisheye lens may coincide with a central axis of the second fisheye lens.

In some aspects, another panoramic Unmanned Aerial Vehicle (UAV) is provided. The panoramic UAV may include a body; a first fisheye lens protruding from one side of the body; a second fisheye lens protruding from an opposing side of the body; and two first arms each rotatably connected to the body. When the two first arms are in a folded mode, the second fisheye lens may be located between the two first arms.

In some implementations, each of the two first arms may be provided, at an end away from the body, with a grounding surface; and when the two first arms are in an unfolded mode, the grounding surfaces may be in contact with a landing surface.

In some implementations, when the two first arms are in the folded mode, none of the grounding surfaces is in contact with the landing surface.

In some implementations, the one side of the body comprises a top of the body, and the opposing side of the body comprises a bottom of the body.

In some implementations, the panoramic UAV may further include two second arms rotatably connected to the body. The two second arms may be arranged closer to a top of the body than the two first arms; and the two first arms may be located on a side of the supporting part away from the second fisheye lens, and the two second arms may be located on another side of the supporting part closer to the second fisheye lens.

In some implementations, each arm of the two first arms and the two second arms may include a rotating arm rotatably connected to the body, a blade being provided at an end of the rotating arm away from the body; and when the two first arms and the two second arms switches from the unfolded mode to the folded mode, the rotating arms may rotate towards each other in a direction toward the body.

In some implementations, the first fisheye lens may include a first stitching region; the second fisheye lens may include a second stitching region. A stitching blind area may be formed by a region that is not covered by the first stitching region and is not covered by the second stitching region. When the two first arms and the two second arms are in the unfolded mode, remaining components of the panoramic UAV, other than the first fisheye lens and the second fisheye lens, may be located within the stitching blind area.

In some aspects, an Unmanned Aerial Vehicle (UAV) is provided. The UAV may include a body; a first fisheye lens protruding from one side of the body; a second fisheye lens protruding from an opposing side of the body; and two first arms each provided, at an end away from the body, with a grounding surface. When the two first arms are in an unfolded mode, the grounding surfaces may be in contact with a landing surface.

In some implementations, the one side of the body comprises a top of the body, and the opposing side of the body comprises a bottom of the body.

In some implementations, a supporting part may be provided on the bottom of the body. When the two first arms are in the unfolded mode, the grounding surfaces and the supporting part may be in contact with the landing surface.

In some implementations, when the two first arms are in a folded mode, the supporting part is in contact with the landing surface, and none of the grounding surfaces is in contact with the landing surface.

In some implementations, when the two first arms are in a folded mode, the second fisheye lens may be located between the two first arms.

In some implementations, the first fisheye lens may include a first stitching region. The second fisheye lens may include a second stitching region. A stitching blind area may be formed by a region that is not covered by the first stitching region and is not covered by the second stitching region. When the two first arms are in an unfolded mode, remaining components of the UAV, other than the first and second fisheye lenses, may be located within the stitching blind area.

In some implementations, a central axis of the first fisheye lens may coincide with a central axis of the second fisheye lens.

In some aspects, another panoramic Unmanned Aerial Vehicle (UAV) is provided. The panoramic UAV may include a body; a first fisheye lens protruding from a top of the body; a second fisheye lens protruding from a bottom of the body; two first arms provided on a side of the body away from the second fisheye lens; and two second arms provided on another side of the body close to the second fisheye lens. At least one of the first fisheye lens and the second fisheye lens may be located between the two second arms.

In some implementations, a central axis of the first fisheye lens may coincide with a central axis of the second fisheye lens.

In some implementations, a blade is provided at an end of at least one of the two first arms and the two second arms, the end being being away from the body.

In some implementations, the first fisheye lens may include a first stitching region; the second fisheye lens may include a second stitching region; a stitching blind area may be formed by a region that is not covered by the first stitching region and is not covered by the second stitching region; and remaining components of the panoramic UAV, other than the first fisheye lens and the second fisheye lens, may be located within the stitching blind area.

In some implementations, each of the first arms and the second arms may include a rotating arm rotatably connected to the body.

The panoramic UAV described above, when in the unfolded mode, has parts other than the first fisheye lens and the second fisheye lens located within the stitching blind area, so that the first fisheye lens and the second fisheye lens are not obstructed during shooting, thereby achieving panoramic shooting. Additionally, the panoramic UAV provides the second fisheye lens on the bottom shell completely between the plane where the top shell is located and the plane where the supporting surface of the bottom shell is located. When the panoramic UAV lands, the supporting surface contacts the landing surface, such as the ground or a tabletop, and the second fisheye lens does not contact the landing surface, thereby protecting the second fisheye lens. Compared with panoramic UAVs in the related art that protect the lens by setting a telescopic structure, the panoramic UAV described above has a simple structure for protecting the second fisheye lens, reducing the overall weight of the panoramic UAV, and thereby improving the endurance time of the panoramic UAV.

Other features, objectives, and advantages of the present disclosure will become apparent from the following detailed description and accompanying drawings.

BRIEF DESCRIPTION OF DRAWINGS

Understanding of the nature and advantages of specific implementations can be achieved by referring to the remainder of the specification and the drawings, in which similar reference numerals are used to refer to similar components. In some cases, sub-reference numerals are associated with reference numerals to indicate one of a plurality of similar components. When reference is made to a reference numeral without specifying a sub-reference numeral, it is intended to refer to all such similar components.

Figure 1:
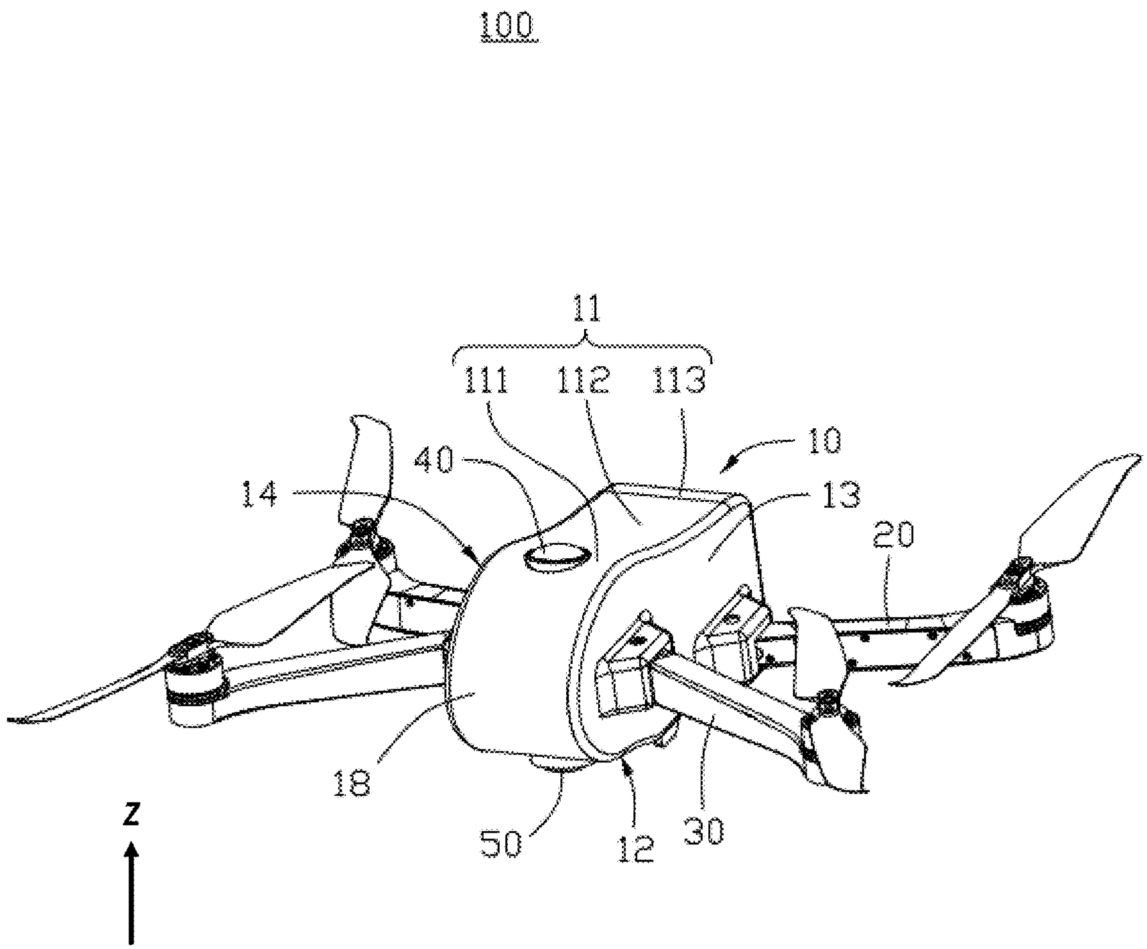
FIG. 1 is a perspective view of a panoramic UAV in the unfolded mode of the arms, according to some aspects of the present disclosure.

The present disclosure will be described with reference to the accompanying drawings.

DETAILED DESCRIPTION

The following description, in conjunction with the accompanying drawings of the implementations of the present disclosure, provides a clear description of the technical solutions in the implementations of the present disclosure. It can be understood that the described implementations are only part of the implementations of the present disclosure, not all of them. Based on the implementations in the present disclosure, all other implementations obtained by those skilled in the art without creative efforts fall within the scope of protection of the present disclosure.

The detailed description below shows some exemplary implementations in more detail to enable those skilled in the art to practice such implementations. The implementations described are provided only for illustrative purposes and are not intended to limit the scope of the present disclosure.

In the following description, certain details are set forth for the purpose of providing a thorough understanding of the implementations described. However, it will be apparent to those skilled in the art that the present disclosure may be practiced without some of these specific details. In other instances, certain structures and devices are shown in a block diagram form. Several implementations are described herein, and although various features are attributed to different implementations, it should be understood that features described concerning some implementations can also be combined with other implementations. However, for the same reasons, one or more features of any described implementation should not be considered essential to every implementation of the present disclosure, as other implementations of the present disclosure may omit these features.

Unless otherwise stated, all numbers, dimensions, etc., used herein should be understood as being modified by the term "about" in all instances. In the present disclosure, the use of the singular term includes the plural term unless otherwise explicitly stated, and the use of the terms "and" and "or" indicates "and/or" unless otherwise stated. Moreover, the terms "comprising" and "comprise" and other forms such as "includes" and "contains" should be considered non-exclusive. Additionally, unless specifically stated otherwise, terms such as "element" or "component" encompass elements and components that include a single unit and those that include more than one unit.

A portion of the existing solutions employs a single gimbal-mounted camera or a multi-camera setup. When capturing panoramic images, however, components of the UAV, such as arms and propellers, may enter the camera's field of view, resulting in blockage of the image stitching regions.

Another portion of the solutions attempts to expand the field of view by increasing the number of fisheye lenses. Due to the unsuitable positioning of the lenses, however, such approaches may lead to insufficient blind spot coverage or redundant data collection.

Therefore, there exists a need to provide a panoramic UAV capable of achieving a panoramic field of view while minimizing weight and improving flight endurance. To address the aforementioned and other issues, some aspects of the present disclosure provide to a panoramic UAV configured with top and bottom fisheye lenses protruding from the body of the UAV. The image stitching regions formed by the respective fields of view are well-arranged such that structural components (e.g., the arms and propellers) are located within the stitching blind zones, thereby preventing them from interfering with the captured image.

Figure 2:
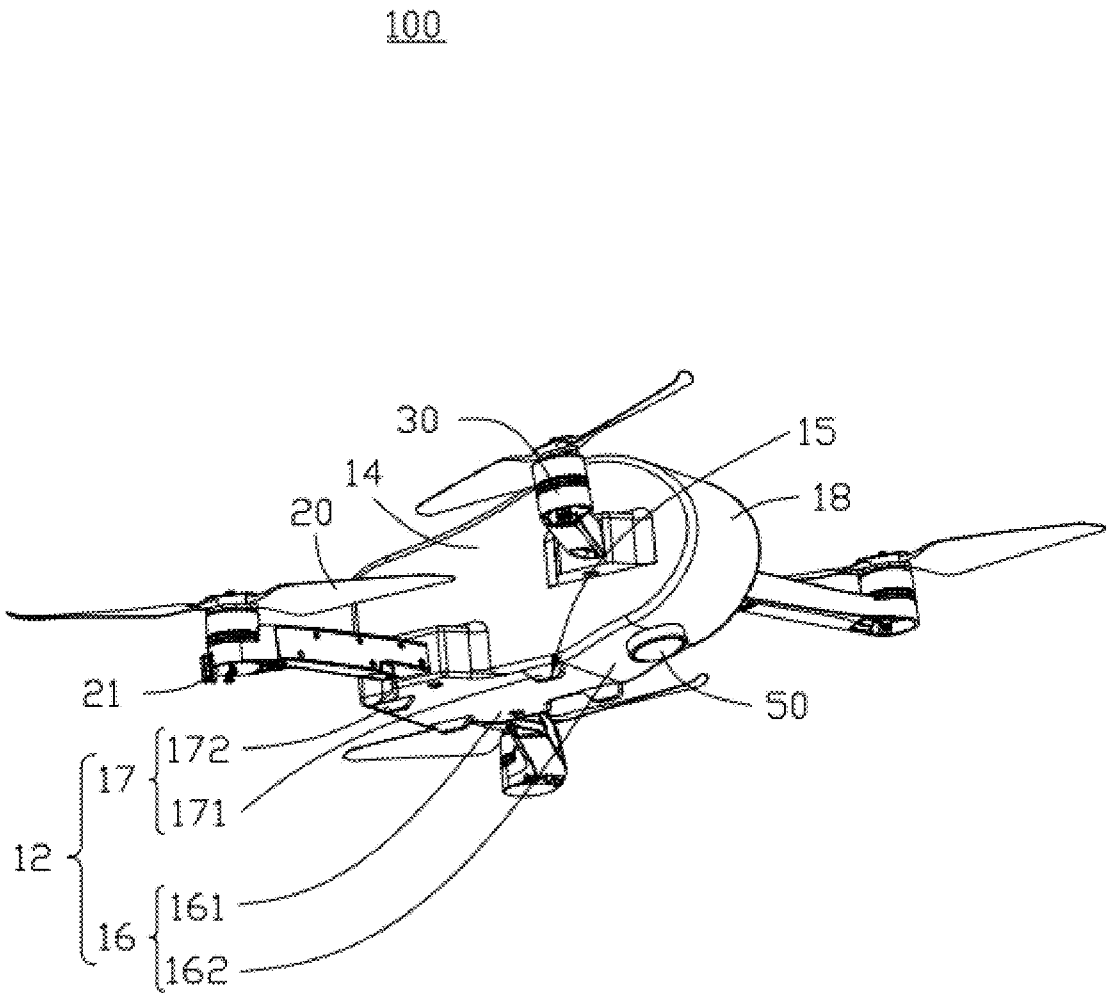
FIG. 2 is another perspective view of the panoramic UAV, according to some aspects of the present disclosure.
Figure 3:
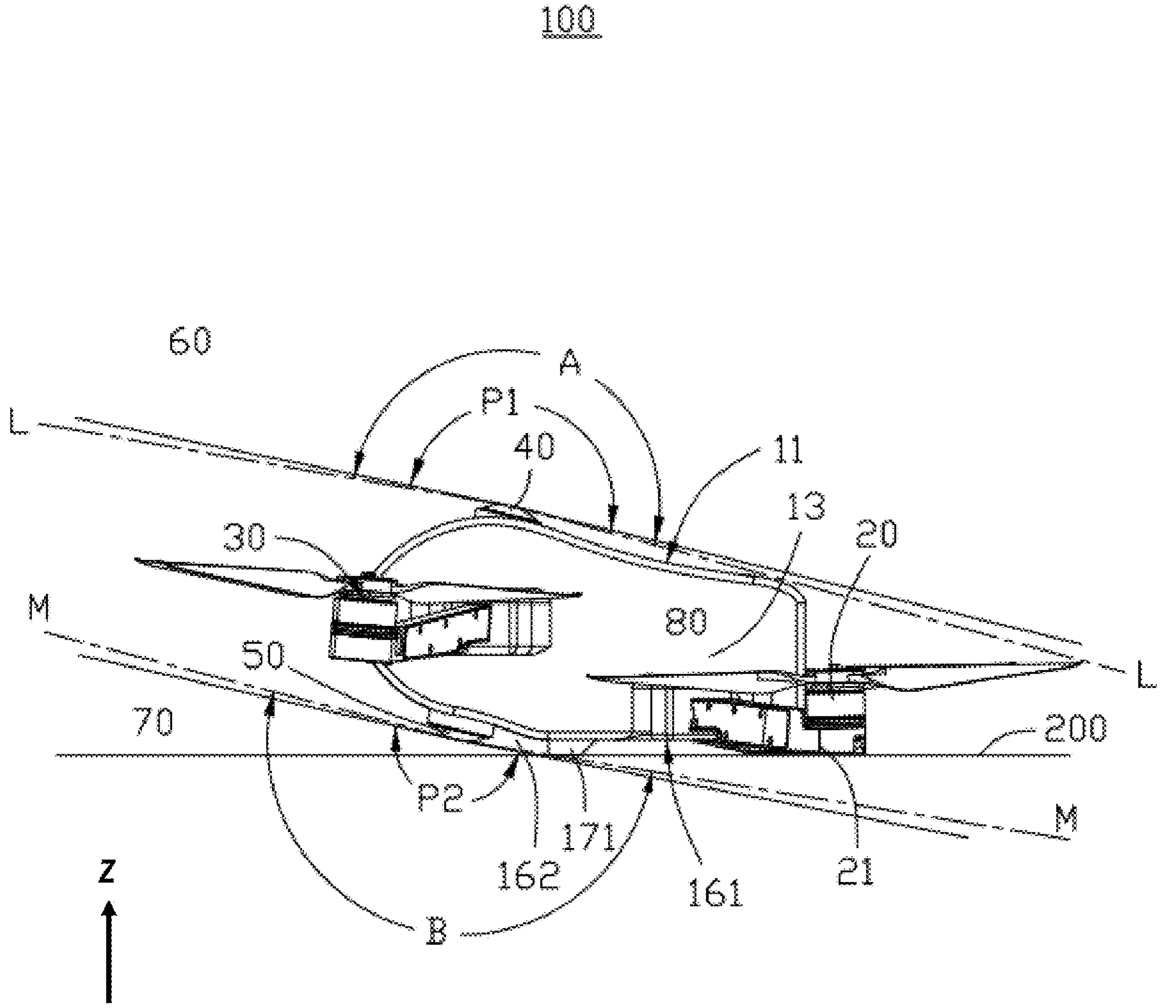
FIG. 3 is a side view of the panoramic UAV with the arms in the unfolded mode, according to some aspects of the present disclosure.

Please refer to FIGS. 1 to 3. According to some implementations of the present disclosure, a panoramic UAV 100 is provided. The panoramic UAV 100 can perform panoramic shooting and lens protection without setting up a support frame or lens telescopic structure, thereby reducing the overall weight of the panoramic UAV 100 and enhancing the endurance time of the panoramic UAV 100.

The panoramic UAV 100 may include a body 10, a plurality of arms (e.g., the first arm 20, the second arm 30), a first fisheye lens 40, and a second fisheye lens 50. The body 10 may include a top shell 11, a bottom shell 12, and a side shell (not specifically annotated with reference numeral) connected between the top shell 11 and the bottom shell 12. In the present disclosure, the terms "top" and "bottom" refer to directions along the z-axis as illustrated in FIG. 1. These terms are intended as relative reference points rather than absolute positions, and are used solely for ease of description and reference. In some implementations, the top side and the bottom side may be opposite to each other, and thus one of them is referred to one side while the other is referred to as an opposing side.

In some implementations, the bottom shell 12 may include a supporting surface 15 (shown in FIG. 2) away from the top shell 11. The side shell may include a first side shell 13 and a second side shell 14 arranged opposite to each other. The plurality of arms are connected to the first side shell 13 and the second side shell 14, and the plurality of arms may have an unfolded mode and a folded mode. The term "unfolded mode" can be used to describe that the plurality of arms are in a deployed state, while the term "folded mode," on the other hand, can be used to describe that the plurality of arms are in a stowed state.

Figure 5:
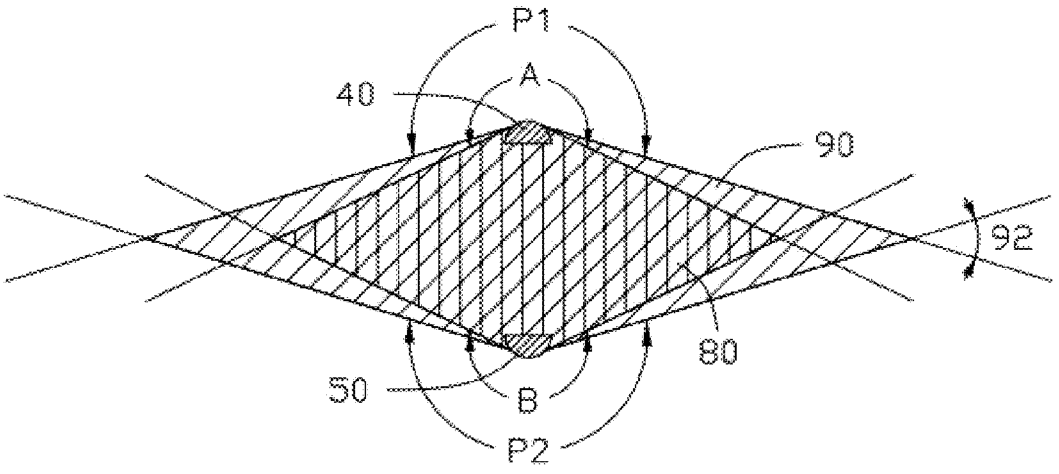
FIG. 5 is a schematic diagram of the field of view regions and stitching regions of the fisheye lenses in the panoramic UAV, according to some aspects of the present disclosure.

Please refer to FIGS. 3 and 5. The first fisheye lens 40 can be located at the top shell 11. In some examples, the first fisheye lens 40 may be arranged on the top shell 11. The first fisheye lens 40 may include a first field of view region A and a first stitching region P1, where the first field of view region A and the first stitching region P1 are both greater than 180°. The first stitching region P1 does not exceed the range of the first field of view region A. For instance, in some implementations, the first field of view region A is 210°, and the first stitching region P1 is 190°. In other implementations, the first stitching region P1 can be arranged within the range of the first field of view region A. Therefore, it has a first field of view region 60 defined by the top shell 11 and a first stitching region not exceeding the range of the first field of view region 60.

FIG. 3 shows the first field of view region 60. FIG. 3 is a side view of the panoramic UAV 100 in the unfolded mode. As shown in FIG. 3, in some implementations, the first field of view region 60 may include the area above lines L. Lines L may represent the two sides relative to the first fisheye lens 40 that define the boundaries of the first field of view angle A. However, those skilled in the art should understand from FIG. 1 that the first field of view region 60 is essentially a partial spherical region located on the side of the mirror surface of the first fisheye lens 40 away from the bottom shell 12. The first stitching region is also a partially spherical region located on the side of the mirror surface of the first fisheye lens 40 away from the bottom shell 12 and is entirely within the range of the first field of view region 60.

In some implementations, the second fisheye lens 50 is arranged on the bottom shell 12 and is located completely between the top shell 11 and the plane where the supporting surface 15 is located. In some examples, the second fisheye lens 50 includes a second field of view region B and a second stitching region P2, where the second field of view region B and the stitching region angle are both greater than 180°, and the second stitching region P2 does not exceed the range of the second field of view region B. For instance, in some implementations, the second field of view region B is 210°, and the second stitching region P2 is 190°. Therefore, as shown in FIG. 3, it may have a second field of view region 70 defined by the bottom shell 12 and a second stitching region not exceeding the range of the second field of view region 70. FIG. 3 shows the second field of view region 70. Similar to the first field of view region 60, the second field of view region 70 may include the area below lines M. Lines M may represent the two sides relative to the second fisheye lens 50 that define the boundaries of the second field of view angle B. However, those skilled in the art should understand from FIG. 1 that the second field of view region 70 is essentially a partial spherical region located on the side of the mirror surface of the second fisheye lens 50 away from the top shell 11. The second stitching region is also a partially spherical region located on the side of the mirror surface of the second fisheye lens 50 away from the top shell 11 and is entirely within the range of the second field of view region 70. As the field of view angles A and B of the first fisheye lens 40 and the second fisheye lens 50 are both greater than 180°, the first field of view region 60 can intersect with the second field of view region 70 to form an overlapping area (not shown in FIG. 3 but shown in FIG. 5) and a stitching blind area 80. The overlapping area may refer to the area that both the second field of view region 70 and the first field of view region 60 can cover, and the stitching blind area 80 refers to the area that neither the second field of view region 70 nor the first field of view region 60 can cover, as shown in FIG. 5. Similarly, as the first stitching region angle P1 and the second stitching region angle P2 are both greater than 180°, the first stitching region and the second stitching region intersect to form an overlapping area that is a stitching angle region 92, and the area not covered by the first stitching region and not covered by the second stitching region may form the stitching blind area 90. In other words, this area is a region not covered by either the first stitching region or the second stitching region.

In one scheme of some implementations, the first field of view angle A of the first fisheye lens and the first stitching region angle P1 are the same, and the second field of view angle B of the second fisheye lens and the first stitching region angle P1 are the same. As a result, the stitching blind area 80 and the stitching blind area 90 are the same (e.g., completely or substantially overlapping), and the plurality of arms are located within the stitching blind area 80 of the first fisheye lens 40 and the second fisheye lens 50 in the unfolded mode. Accordingly, the first fisheye lens 40 and the second fisheye lens 50 will not be blocked by any arm during shooting, so the images taken by the first fisheye lens 40 and the second fisheye lens 50 at the same time can be synthesized into a panoramic image, thereby achieving panoramic shooting.

In another scheme of some implementations, the first field of view angle A of the first fisheye lens 40 is greater than the first stitching region angle P1, and the second field of view angle B of the second fisheye lens 50 is greater than the first stitching region angle P1. The plurality of arms are located within the stitching blind area 90 of the first fisheye lens 40 and the second fisheye lens 50 in the unfolded mode. Therefore, the panoramic image synthesized by the first fisheye lens 40 and the second fisheye lens 50 does not include other components of the panoramic UAV 100, including the plurality of arms, thereby achieving unobstructed panoramic shooting.

It should be noted that due to the severe image distortion at the field of view boundary of the fisheye lens, the panoramic video effect formed by stitching the stitching region after removing the field of view boundary area is better. In addition, the image of the stitching angle region 92 formed by the intersection of the first stitching region angle P1 and the second stitching region angle P2 will be removed and will not be included in the panoramic video formed after stitching.

It should also be noted that the field of view angles A, B of the first fisheye lens 40 and the second fisheye lens 50, and the first and second stitching region angles P1, P2 in the implementations of the present disclosure can all be the same, partially the same, or all different, and can be adjusted correspondingly according to the structure setting of the panoramic UAV 100. The present disclosure does not limit thereto.

Please refer to FIGS. 1 to 3. In some implementations, the top shell 11 includes a first top shell part 111, a second top shell part 112, and a third top shell part 113. The second top shell part 112 is connected between the first top shell part 111 and the third top shell part 113. In some examples, the second top shell part 112 can be recessed inward. The portion of the third top shell part 113 that is farthest from a plane where the supporting surface 15 is located (the "plane") is closer to the plane than the portion of the first top shell part 111 that is farthest from the plane.

In some examples, the first fisheye lens 40 can be convexly arranged on the portion of the first top shell part 111 farthest from the plane where the supporting surface 15 is located and is inclined towards the third top shell part 113. In some implementations, the first top shell part 111 and the third top shell part 113 can be convex curved surfaces, and the second top shell part 112 can be a concave curved surface. The protruding curvature of the third top shell part 113 is smaller than that of the first top shell part 111. Thus, the first fisheye lens 40 is located at the highest point of the top shell 11, making the second top shell part 112 and the third top shell part 113 located outside the first field of view region 60 of the first fisheye lens 40.

Please refer to FIG. 2. The bottom shell 12 includes a base shell 16 and a plurality of supporting parts 17 arranged on the base shell 16. In some implementations, the second fisheye lens 50 can be arranged on the base shell 16, and a surface of the supporting part 17 away from the base shell 16 is the supporting surface 15. In some examples, the base shell 16 can include a first base shell part 161 and a second base shell part 162. The second base shell part 162 is connected to the first base shell part 161 and inclined towards the top shell 11. The second base shell part 162 can be a concave surface, convex surface, or inclined surface, and the second fisheye lens 50 can be arranged on the second base shell part 162. Accordingly, the second fisheye lens 50 is arranged in the recessed part of the base shell 16. Consequently, when the panoramic UAV 100 lands, it can prevent the second fisheye lens 50 from contacting the landing surface 200 (e.g., the ground), thereby preventing the second fisheye lens 50 from being damaged or scratched by the hard landing surface 200.

In some implementations, the second base shell part 162 can be a concave surface, and the central axis of the second fisheye lens 50 can coincide with a normal vector of the second base shell part 162. Thus, the second fisheye lens 50 can be arranged at the most recessed part of the second base shell part 162, thereby minimizing the distance between the supporting surface 15 and the top shell 11 while maximizing the protection of the second fisheye lens 50. Further, the central axis of the second fisheye lens 50 can also coincide with the central axis of the first fisheye lens 40. Thus, the second fisheye lens 50 and the first fisheye lens 40 can be arranged almost symmetrically on the body 10, so that the panoramic UAV 100 can obtain a better visual effect.

As shown in FIG. 2, the plurality of supporting parts 17 can include a first supporting part 171 and a second supporting part 172. In some examples, each of the supporting parts can include a landing gear which is retractable. In some examples, the number of the first supporting part 171 and the second supporting part 172 are both two, and the two first supporting parts 171 and the two second supporting parts 172 are respectively located on two sides of the second fisheye lens 50. It can be understood that the number of the first supporting part 171 and the second supporting part 172 is not limited to two, and can be one or more. The number of the first supporting part 171 and the second supporting part 172 can also be different, such as setting one supporting part 171 and two second supporting parts 172.

As shown in FIG. 5, the first supporting part 171 is located between the second fisheye lens 50 and the second supporting part 172, and the center of gravity of the panoramic UAV 100 is located between the first supporting part 171 and the second supporting part 172. In some implementations, the distance between the supporting surface 15 of the second supporting part 172 and the base shell 16 is less than the distance between the supporting surface 15 of the first supporting part 171 and the base shell 16. Thus, after the panoramic UAV 100 lands, under the action of gravity, the end of the panoramic UAV 100 near the second supporting part 172 will approach the landing surface 200, while the end near the first supporting part 171 will move away from the landing surface 200. Correspondingly, the second fisheye lens 50 will also be lifted and moved away from the landing surface 200, thereby further protecting the second fisheye lens 50. In some implementations, the first fisheye lens 40 and the second fisheye lens 50 are located at one end of the panoramic UAV 100, while components such as the battery and/or the main control board of the panoramic UAV 100 are located at the other end of the panoramic UAV 100, so that the center of gravity of the panoramic UAV 100 is located between the first supporting part 171 and the second supporting part 172.

In some implementations, the bottom shell 12 can include the aforementioned base shell 16 but does not include the aforementioned supporting part 17. The second fisheye lens 50 is arranged on the base shell 16, and a surface of the first base shell part 161 away from the top shell 11 is the supporting surface 15. The second fisheye lens 50 is located at one end of the panoramic UAV 100, and the center of gravity of the panoramic UAV 100 is located at the other end away from the second fisheye lens 50. After the panoramic UAV 100 lands, the end away from the second fisheye lens 50, including part of the first base shell part 161, approaches the landing surface 200 and contacts the landing surface 200, while the end where the second fisheye lens 50 is located is slightly tilted up to protect the second fisheye lens 50.

As shown in FIGS. 1 and 2, the plurality of arms include two first arms 20. The two first arms 20 are respectively connected to the first side shell 13 and the second side shell 14. A surface of each first arm 20 at an end away from the top shell 11 is a grounding surface 21. In the unfolded mode, the grounding surface 21 is coplanar with the supporting surface 15 of the first supporting part 171. As shown in FIG. 3, when the panoramic UAV 100 just lands on the ground, that is, when the plurality of arms are in the unfolded mode, the grounding surface 21 of the two first arms 20 and the two first supporting parts 171 contact the landing surface 200 to support the panoramic UAV 100. At this time, the second fisheye lens 50 is located between the plane where the supporting surface 15 of the first supporting part 171 is located and the top shell 11, so that there is a certain distance between the second fisheye lens 50 and the landing surface 200, avoiding direct contact between the second fisheye lens 50 and the landing surface 200. As a result, it can also prevent objects on the landing surface 200 from scratching the second fisheye lens 50.

Further, the plurality of arms also include two second arms 30. The two second arms 30 can be respectively connected to the first side shell 13 and the second side shell 14. The two second arms 30 are arranged closer to the top shell 11 than the two first arms 20. The two first arms 20 are located on a side of the first supporting part 171 away from the second fisheye lens 50, and the two second arms 30 are located on a side of the first supporting part 171 close to the second fisheye lens 50. Thus, the second arms 30 and the first arms 20 are staggered (e.g., not along a horizontal line; or having an offset in the vertical level), which ensures that the second arms 30 will not interfere with the first arms 20 and reduces the space occupied by the arms in the length direction of the body 10 in the meantime. This arrangement can make the structure of the panoramic UAV 100 more compact. As shown in FIGS. 1 and 2, in the unfolded mode, the second fisheye lens 50 is located between the two second arms 30.

It can be understood that each of the number of the first arms 20 and the number of the second arms 30 is not limited to two. In some examples, it can be more than two, as long as they are arranged in groups on the first side shell 13 and the second side shell 14.

Figure 4:
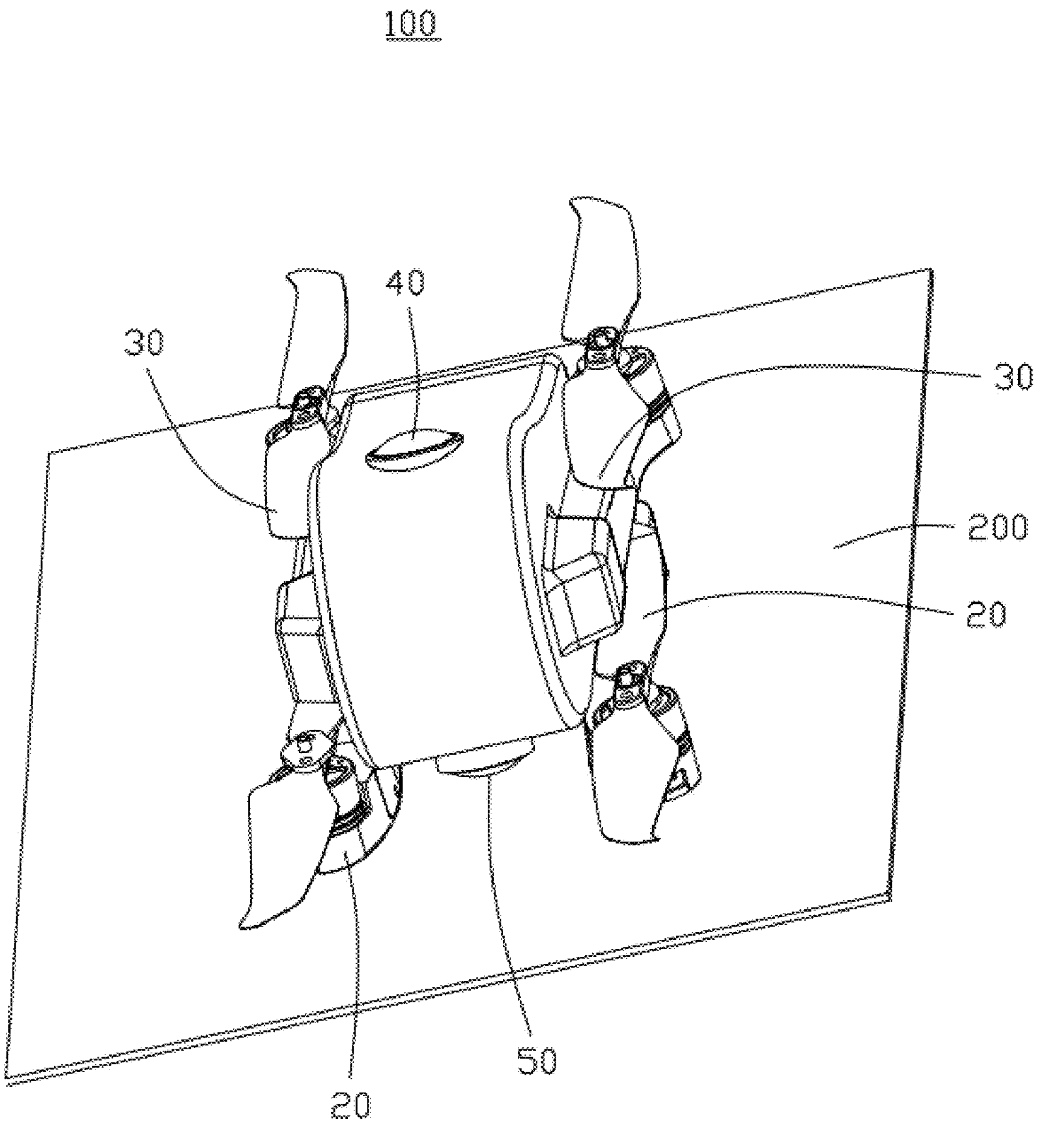
FIG. 4 is a perspective view of the panoramic UAV with the arms in the folded mode, according to some aspects of the present disclosure.

In some implementations, the plurality of arms only have an unfolded mode, and the plurality of arms are fixedly connected to the body 10. Please also refer to FIGS. 1 and 4. In some implementations, the plurality of arms not only include an unfolded mode but also a folded mode. In some implementations, the plurality of arms are foldably connected to the first side shell 13 and the second side shell 14. In the present disclosure, the term "foldably" is used to describe that each of the arms has at least two modes including the unfolded mode and the folded mode. In the unfolded mode, the arms are deployed, while in the folded mode, the arms are stowed. Therefore, in the present disclosure, the term "unfolded mode" may be viewed to be substantially equivalent to the term "deployed mode." On the other hand, the term "folded mode" may be viewed to be substantially equivalent to the term "stowed mode."

In some implementations, each arm includes a rotating arm rotatably connected to the side shell and a blade 22 rotatably connected to an end of the rotating arm away from the side shell. When the panoramic UAV 100 transitions/switches from the unfolded mode to the folded mode, the rotating arm of the first arm 20 and the rotating arm of the second arm 30 rotate towards each other and close to their respective side shells until the rotating arms 21 of each arm are arranged parallel or nearly parallel to the side shell.

Figure 6:
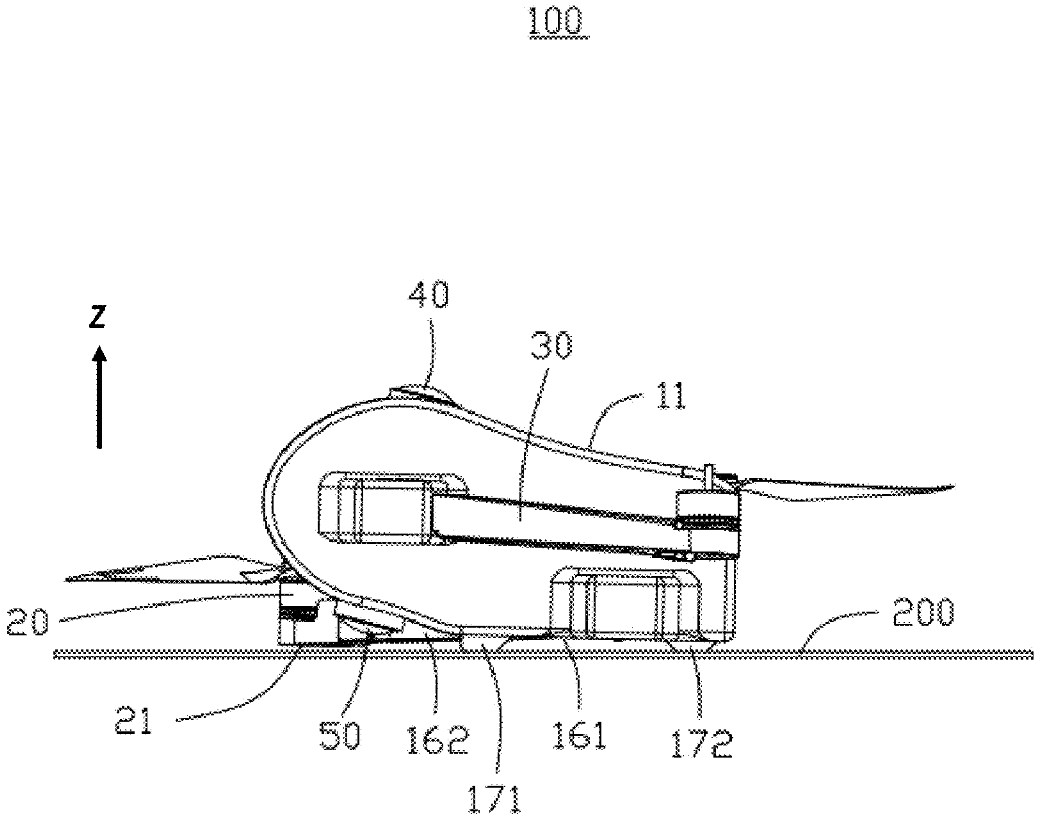
FIG. 6 is a side view of the panoramic UAV with the arms in the folded mode, according to some aspects of the present disclosure.

Please refer to FIG. 6. When the plurality of arms are in the folded mode, the second fisheye lens 50 is located between the two first arms 20, and the grounding surface 21 is located between the supporting surface 15 of the first supporting part 171 and the top shell 11. In the folded mode, since the second fisheye lens 50 is located between the two first arms 20, the second lens is shielded between the two first arms 20 in the projection direction towards the side wall, thereby protecting the second fisheye lens 50 from the side. In the folded mode, as the grounding surface 21 is located between the supporting surface 15 of the first supporting part 171 and the top shell 11, when the panoramic UAV 100 lands and the arms are folded, the first arm 20 has a certain distance from the landing surface 200, and the first arm 20 will no longer support the panoramic UAV 100. When the panoramic UAV 100 transitions from the unfolded mode to the folded mode after landing, the grounding surface 21 of the first arm 20 and the supporting surface 15 of the first supporting part 171 contact the landing surface 200 to support the panoramic UAV 100. Then, the folding of the first arm 20 raises the first arm 20 relative to the landing surface 200. At the same time, since the center of gravity of the panoramic UAV 100 is located between the first supporting part 171 and the second supporting part 172, the end of the panoramic UAV 100 away from the second fisheye lens 50 approaches the landing surface 200, and the supporting surface 15 of the second supporting part 172 replaces the grounding surface 21 of the first arm 20 and the supporting surface 15 of the first supporting part 171 to contact the landing surface 200 to support the panoramic UAV 100.

Figure 7:
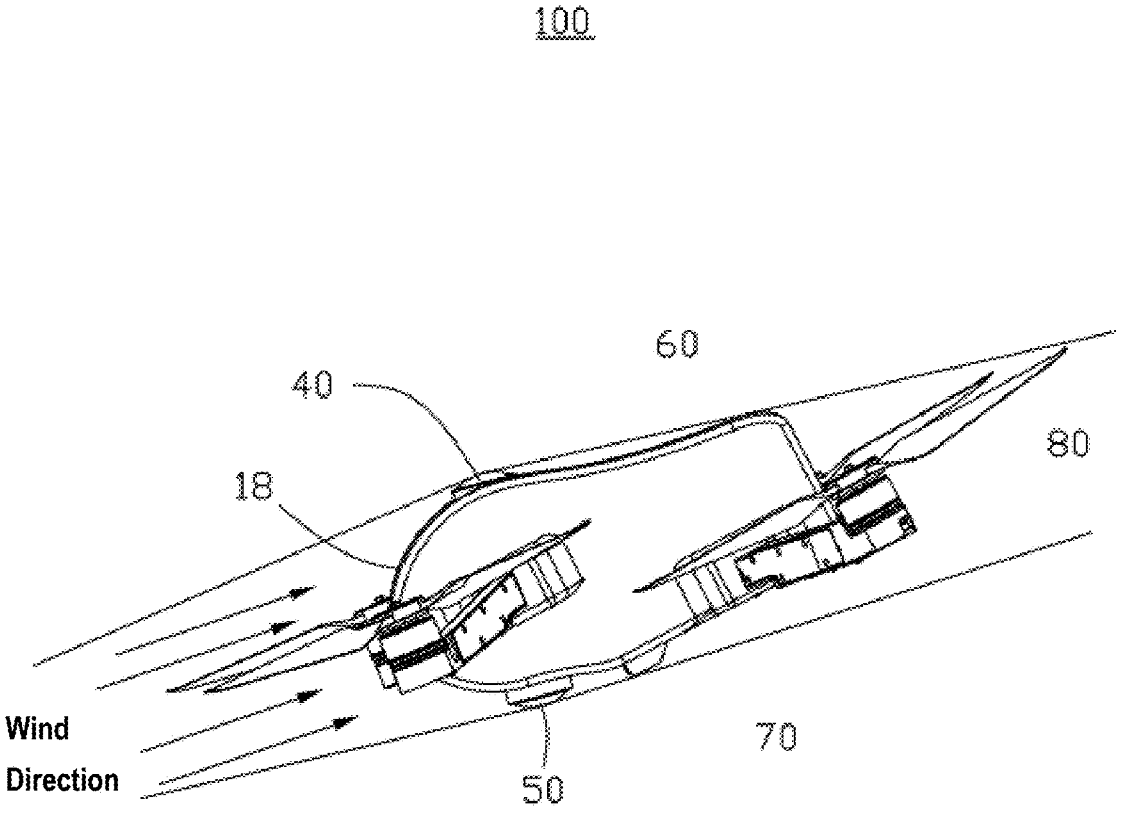
FIG. 7 is a schematic diagram of the panoramic UAV during flight, according to some aspects of the present disclosure.

Please refer to FIGS. 1 and 7. The first side shell 13 and the second side shell 14 extend along the length direction of the body 10 beyond the top shell 11 and the bottom shell 12. In some examples, the body 10 further includes a front shell 18. The front shell 18 is connected to the top shell 11 and the bottom shell 12 at an end close to the second fisheye lens 50 and is connected with the first side shell 13 and the second side shell 14. The front shell 18 is a convex curved surface, achieving a smooth transition from the bottom shell 12 to the bottom shell 12. Thus, when the panoramic UAV 100 just takes off, it can effectively reduce air resistance, reduce power consumption, and extend the endurance time of the panoramic UAV 100.

In the unfolded mode, the remaining components of the panoramic UAV 100 other than the first fisheye lens 40 and the second fisheye lens 50 (e.g., the plurality of arms) are located within the stitching blind area 90, so that the first fisheye lens 40 and the second fisheye lens 50 are not blocked by the arms during shooting, thereby achieving panoramic shooting.

In the present disclosure, the term "remaining components" may refer to all other components of the panoramic UAV 100, excluding the first fisheye lens 40 and the second fisheye lens 50. For instance, the remaining components may include the body 20, the battery, the main control board, the first arm 20, the second arms 30, and any structural elements that are included in the panoramic UAV 100.

Additionally, the panoramic UAV 100 completely locates the second fisheye lens 50 on the bottom shell 12 between the plane where the top shell 11 and the supporting surface 15 on the bottom shell 12 are located. When the panoramic UAV 100 lands, the supporting surface 15 contacts the landing surface 200, such as the ground or a table, and the second fisheye lens 50 does not contact the landing surface 200, thereby protecting the second fisheye lens 50. Compared with the panoramic UAV 100 in the related art, which protects the lens by setting a telescopic structure, the panoramic UAV 100 described above has a simple structure for protecting the second fisheye lens 50, reducing the overall weight of the panoramic UAV 100, thereby enhancing the endurance time of the panoramic UAV 100.

Accordingly, a panoramic UAV configured with top and bottom fisheye lenses protruding from the body of the UAV can be provided. The image stitching regions formed by the respective fields of view are well-arranged such that structural components (e.g., the arms and propellers) are located within the stitching blind zones, thereby preventing them from interfering with the captured image.

Furthermore, a retractable support structure may be disposed on the body of the UAV. The support structure retracts into the body during flight and camera operation, and extends downward during landing to prevent contact between the lenses and the landing surface.

A lifting mechanism may be provided to connect the lenses to the body of the UAV in a retractable manner. The lenses extend outward from the body during image capture and retract into the body prior to landing, thereby avoiding contact with the surface.

Although certain features and aspects of exemplary implementations have been described, those skilled in the art will recognize that many modifications are possible. For example, the methods and processes described in the present disclosure can be implemented using hardware components, software components, and/or any combination thereof. Furthermore, although various methods and processes have been described concerning specific structural and/or functional components, the methods provided by the various implementations are not limited to any specific structural and/or functional architecture but can be implemented in any suitable hardware, firmware, and/or software configuration. Similarly, although certain functions are attributed to certain system components, unless the context indicates otherwise, the function may be distributed among various other system components according to several implementations.

Furthermore, for convenience of description, although the methods and processes of the present disclosure have been described in a specific order, unless the context indicates otherwise, various processes may be reordered, added, and/or omitted according to various implementations. Moreover, processes described concerning one method or process may be incorporated into other described methods or processes; however, the present disclosure is not limited to this. Similarly, although various implementations have been described with or without certain features, the various components and/or features described concerning specific implementations herein may be replaced, added, and/or removed unless the context indicates otherwise. Therefore, although several exemplary implementations have been described above, it should be understood that the present disclosure is intended to cover all modifications and equivalent forms within the scope of the appended claims.

What is claimed is:

1. A panoramic Unmanned Aerial Vehicle (UAV), comprising:

a body, a bottom of the body comprising a supporting part configured to be in direct contact with a landing surface;

a first fisheye lens comprising a first field of view region and a first stitching region, wherein a range of the first stitching region is greater than 180°, and the range of the first stitching region is smaller than a range of the first field of view region;

a second fisheye lens comprising a second field of view region and a second stitching region, wherein a range of the second stitching region is greater than 180°, and the range of the second stitching region is smaller than a range of the second field of view region; and a battery and a main control board, the first fisheye lens and the second fisheye lens being located at one end of the panoramic UAV, and at least one of the battery or the main control board being located at another end of the panoramic UAV;

wherein:

a central axis of the first fisheye lens and a central axis of the second fisheye lens coincide to form a coincident central line, the central axis of the first fisheye lens extending through a center of the first fisheye lens, and the central axis of the second fisheye lens extending through a center of the second fisheye lens;

the first stitching region and the second stitching region overlap to form a stitching angle region, and a region outside the first stitching region and outside the second stitching region forms a stitching blind area; and when the panoramic UAV performs panoramic shooting through the first and second fisheye lenses, remaining components of the panoramic UAV, other than the first fisheye lens and the second fisheye lens, are located within the stitching blind area, wherein the first fisheye lens and the second fisheye lens are configured to simultaneously capture respective images, the respective images being stitched together based on the first stitching region and the second stitching region to form a panoramic image in which the remaining components located within the stitching blind area are not shown.

2. The panoramic UAV according to claim 1, wherein the first fisheye lens protrudes from a top of the body, and the second fisheye lens protrudes from a bottom of the body.

3. The panoramic UAV according to claim 2, further comprising:

a plurality of arms connected to the body, wherein:

the plurality of arms comprise two first arms each comprising a grounding surface located at an end away from the body, and when the two first arms are in an unfolded mode, the grounding surface and the supporting part are in contact with a landing surface.

4. The panoramic UAV according to claim 3, wherein:

the plurality of arms further comprise two second arms respectively connected to the body, the two second arms being closer to the top of the body than the two first arms; and the two first arms are located on a side of the supporting part away from the second fisheye lens, and the two second arms are located on another side of the supporting part close to the second fisheye lens.

5. The panoramic UAV according to claim 4, wherein:

the two first arms are foldably connected to the body; and when the two first arms are in a folded mode, the second fisheye lens is located between the two first arms.

6. The panoramic UAV according to claim 5, wherein:

each arm of the plurality of arms comprises a rotating arm rotatably connected to the body, a blade being provided at an end of the rotating arm away from the body; and when the plurality of arms switch from the unfolded mode to the folded mode, the rotating arms rotate towards each other in a direction toward the body.

7. The panoramic UAV according to claim 2, wherein:

the supporting part comprises a first supporting part and a second supporting part; and a center of gravity of the panoramic UAV is located between the first supporting part and the second supporting part.

8. The panoramic UAV according to claim 7, wherein:

the first fisheye lens and the second fisheye lens are located at a first end of the panoramic UAV, and the center of gravity of the panoramic UAV is located closer to an opposing second end of the panoramic UAV than the first fisheye lens and the second fisheye lens.

9. The panoramic UAV according to claim 1, wherein an upper end of the coincident central line is inclined toward a rear side of the body.

10. The panoramic UAV according to claim 1, wherein:

the body comprises a bottom shell comprising a base shell on which the second fisheye lens is arranged; and the central axis of the second fisheye lens coincides with a normal direction of the base shell.

* * * * *